United States Patent
Park

(10) Patent No.: US 10,459,513 B2
(45) Date of Patent: Oct. 29, 2019

(54) FINANCIAL DEVICE AND CONTROL METHOD THEREOF

(71) Applicant: ATEC AP CO., LTD., Seongnam-si, Gyeonggi-do (KR)

(72) Inventor: Maeng Cheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 15/255,703

(22) Filed: Sep. 2, 2016

(65) Prior Publication Data

US 2017/0060227 A1    Mar. 2, 2017

(30) Foreign Application Priority Data

Sep. 2, 2015 (KR) .................. 10-2015-0123977

(51) Int. Cl.
| | | |
|---|---|---|
| G06F 1/3287 | (2019.01) | |
| G07F 19/00 | (2006.01) | |
| G06F 1/3234 | (2019.01) | |
| G06Q 20/10 | (2012.01) | |
| G06Q 20/08 | (2012.01) | |
| H04N 1/00 | (2006.01) | |
| G06F 1/3228 | (2019.01) | |
| G06F 1/3231 | (2019.01) | |

(52) U.S. Cl.
CPC .......... *G06F 1/3287* (2013.01); *G06F 1/3228* (2013.01); *G06F 1/3231* (2013.01); *G06F 1/3265* (2013.01); *G06Q 20/085* (2013.01); *G06Q 20/1085* (2013.01); *G07F 19/202* (2013.01); *G07F 19/203* (2013.01); *H04N 1/00896* (2013.01); *Y02D 10/153* (2018.01); *Y02D 10/171* (2018.01); *Y02D 10/173* (2018.01); *Y02D 50/20* (2018.01)

(58) Field of Classification Search
None
See application file for complete search history.

(56) References Cited

U.S. PATENT DOCUMENTS

| | | | | |
|---|---|---|---|---|
| 5,978,924 | A * | 11/1999 | Ahn | ................ G06F 1/30 713/323 |
| 2002/0144166 | A1* | 10/2002 | Chang | ............ G06F 1/3203 713/320 |
| 2005/0246565 | A1* | 11/2005 | Koarai | ........... G06F 1/3203 713/323 |
| 2008/0049505 | A1* | 2/2008 | Kim | ............ G06F 13/1694 365/185.11 |
| 2013/0060687 | A1* | 3/2013 | Bak | .............. G06Q 20/20 705/41 |

(Continued)

FOREIGN PATENT DOCUMENTS

| | | |
|---|---|---|
| CN | 203012864 U | 6/2013 |
| CN | 204178474 U | 2/2015 |

(Continued)

*Primary Examiner* — Paul Yen
(74) *Attorney, Agent, or Firm* — Dentons US LLP

(57) ABSTRACT

A financial device may include: one or more modules each including a storage unit; and a main control unit configured to disconnect power to the one or more modules after operation information is stored in the storage unit, when entering a power saving mode. The storage unit may store the operation information of the corresponding module of the one or more modules, when entering the power saving mode.

10 Claims, 8 Drawing Sheets

(56) References Cited

U.S. PATENT DOCUMENTS

2014/0215249 A1* 7/2014 Kawakami ............ G06F 1/3256
                                                                                          713/323
2016/0231922 A1* 8/2016 Ueno .................... G06F 3/0346
2017/0148010 A1   5/2017 Bak et al.
2018/0075439 A1   3/2018 Bak et al.
2018/0357631 A1 12/2018 Bak et al.

FOREIGN PATENT DOCUMENTS

| EP | 2568693 A | 3/2013 |
|---|---|---|
| JP | 2012-243084 A | 12/2012 |
| KR | 10-2009-0037223 A | 4/2009 |
| KR | 10-2010-0079810 A | 7/2010 |
| KR | 10-2013-0012817 A | 2/2013 |
| WO | 2005/109360 A1 | 11/2005 |

* cited by examiner

FIG. 8

| ADDRESS | CONTENTS |
| --- | --- |
| 0x00000000 | 0: RESET MODE |
| | 1: POWER SAVING MODE |
| 0x00000010 | SENSOR VALUES OF SENSORS 1 TO 32<br>IN IDLE STATE (32-BIT BASIS) |
| 0x00000020 | INITIAL VALUES OF ACTUATORS 1 TO 32<br>IN IDLE STATE (32-BIT BASIS) |
| 0x00000030 | INITIAL VALUES OF OTHER PARTS IN IDLE STATE,<br>REQUIRED FOR DRIVING MODULES (32-BIT BASIS) |
| . . . . | . . . . |

FINANCIAL DEVICE AND CONTROL METHOD THEREOF

CROSS-REFERENCES TO RELATED APPLICATION

The present application claims priority under 35 U.S.C. § 119(a) to Korean application number 10-2015-0123977, filed on Sep. 2, 2015, in the Korean Intellectual Property Office, which is incorporated herein by reference in its entirety.

BACKGROUND

1. Technical Field

The present disclosure relates to a financial device and a control method thereof.

2. Related Art

Conventionally, a customer has conducted a financial transaction while being in direct contact with a teller through a window in a financial institution. However, the appearance of ATM (Automatic Teller Machine) has made a breakthrough in terms of various aspects. Specifically, while a customer's waiting time is significantly reduced, a customer can conduct a financial transaction any time even after the business of a financial institution is closed. From the viewpoint of a financial institution, a financial service processing time can be reduced, and business efficiency can be improved due to the reduction of manpower and cost.

The ATM basically provides a variety of financial activities which are performed in a financial institution such as a bank or village fund.

In order to conduct an account transfer, balance inquiry, withdrawal or bankbook update, a user may simply operate an ATM installed in a bank without coming in contact with a teller of the bank. Thus, the user can conduct a desired financial transaction within a short time. Due to such advantages of the ATM, the number of customers using an ATM, the number of installed ATMs, and the number of places where an ATM is installed have rapidly increased. Nowadays, ATMs can be easily found anywhere.

However, since the conventional ATM waits in a power-on state even when a financial transaction such as deposit, withdrawal, transfer or account inquiry is not conducted by a customer, a waste of electric power occurs.

In order to solve such a problem, a power saving mode has been applied to the ATM. In the power saving mode, the ATM turns off a monitor when the ATM is not used, and turns on the monitor when sensing a user who accesses the ATM. However, since only the monitor is controlled in the monitor power saving mode, the power saving effect of the ATM corresponds to only approximately 10% of the total power consumption, which means that the power saving effect is not satisfactory.

SUMMARY

Various embodiments are directed to a power-saving financial device which powers off modules for performing financial activities as well as a screen of the financial device when no users exist, and controls the modules and the screen to enter a transaction standby mode when a user accesses the financial device, thereby saving energy, and a power saving control method thereof.

In an embodiment of the present disclosure, a financial device may include: one or more modules each including a storage unit; and a main control unit configured to disconnect power to the one or more modules after operation information is stored in the storage unit, when entering a power saving mode. The storage unit may store the operation information of the corresponding module of the one or more modules, when entering the power saving mode.

In an embodiment of the present disclosure, a power saving control method of a financial device may include: controlling a display unit and one or more modules to enter a power saving mode, when the financial device satisfies a power saving mode entry condition, the one or more modules performing financial activities; requesting disconnection of power to the one or more modules, when the one or more modules all enter the power saving mode; and immediately entering a transaction standby mode using state information before entering the power saving mode, when receiving a power saving mode cancellation request according to an access of a user, the state information being stored in the one or more modules.

BRIEF DESCRIPTION OF THE DRAWINGS

FIG. 8 illustrates a state information table according to the embodiment.

DETAILED DESCRIPTION

Figure 1:
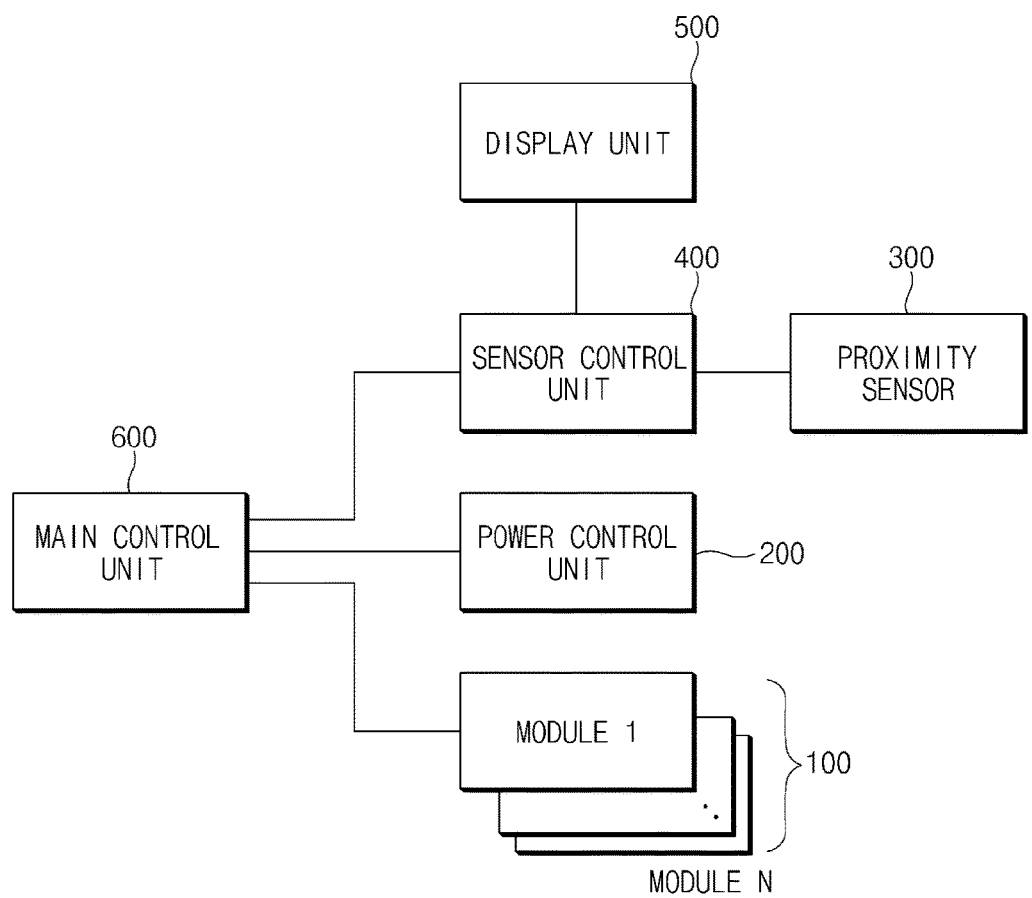
FIG. 1 is a block diagram illustrating the entire components of a financial device according to an embodiment.

Hereinafter, exemplary embodiments of the present disclosure will be described with reference to the accompanying drawings. Regarding the reference numerals assigned to the elements in the drawings, it should be noted that the same elements may be designated by the same reference numerals, wherever possible, even though they are shown in different drawings. Also, in the description of embodiments, detailed description of well-known related structures or functions may be omitted when it is deemed that such description may cause ambiguous interpretation of the present disclosure.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

A financial device according to embodiments is a device that performs financial business, such as medium processing comprising processing such as deposit processing, giro receipt, or gift certificate exchange and/or processing such as withdrawal processing, giro dispensing, or gift certificate dispensing by receiving various media such as, e.g., paper money, bills, giros, coins, gift certificates, etc. For example, the financial device may comprise an automatic teller machine (ATM) such as a cash dispenser (CD) or a cash recycling device. However, the financial device is not limited to the above-described examples. For example, the financial device may be a device for automatically performing the financial business such as a financial information system (FIS).

Hereinafter, assuming that the financial device is an ATM, an embodiment will be described. However, this assumption is merely for convenience of description, and the present invention is not limited to the ATM.

Hereafter, embodiments will be described with reference to the accompanying drawings.

FIG. 1 is a block diagram illustrating the entire components of a financial device according to an embodiment.

Referring to FIG. 1, the financial device according to the embodiment includes a plurality of modules 100 for processing financial transactions, a power control unit 200 for controlling power of the modules 100, a proximity sensor 300 for sensing an access of a user, a sensor control unit 400 for controlling a display unit 500, the display unit 500, and a main control unit 600 for controlling the operations of the respective units. In the present embodiment, the main control unit 600, the sensor control unit 400 and the power control unit 200 are separated from one another. However, the main control unit 600, the sensor control unit 400 and the power control unit 200 may be integrated as one control unit.

The plurality of modules 100 may be implemented as N modules, and correspond to a media processing module, a card reader, a bankbook module and the like, which perform financial transactions of the financial device. When receiving a power saving mode entry command from the main control unit 600, each of the modules 100 stores operation information of a sensor, actuator and the like, enters the power saving mode, and informs the main control unit 600 of the power saving mode entry.

The power control unit 200 controls power-on/off of the plurality of modules 100 according to control of the main control unit 600. That is, when receiving a power-off command from the main control unit 600, the power control unit 200 electrically or physically disconnects power lines of the plurality of modules 100. At this time, power to each of the modules may be removed individually, or a group of modules may be controlled together.

The electrical or physical power control of the module 100 may be performed through FET control or power transistor (TR) control, with reference to actual current consumption of the module.

The proximity sensor 300 senses whether a user accesses the financial device. The proximity sensor 300 may include an infrared sensor or the like, and have two kinds of distance modes. That is, the two kinds of distance modes may include a mode for sensing a user at a long distance from the financial device and a mode for sensing a user at a short distance from the financial device.

When receiving a user sensing signal from the proximity sensor 300, the sensor control unit 400 powers on the display unit 500, and sends the user sensing signal to the main control unit 600. Furthermore, when receiving a request for power saving mode entry of the display unit 500 from the main control unit 600, the sensor control unit 400 controls the display unit 500 to enter the power saving mode. At this time, the power saving mode entry of the display unit 500 is turning off an LCD backlight driver. The sensor control unit 400 may be driven in two kinds of distance modes. When a user at a long distance from the financial device is sensed by the proximity sensor 300, the sensor control unit 400 may inform the main control unit 600 that the user is sensed, and control the financial device to enter a transaction standby mode. When a user at a short distance from the financial device is sensed by the proximity sensor 300, the sensor control unit 400 may immediately output a transaction guide voice to help the user's transaction. At this time, when the distance between the proximity sensor 300 and the user is equal to or more than a preset reference distance, the sensor control unit 400 determines that the distance is a long distance, and when the distance between the proximity sensor 300 and the user is less than the preset reference distance, the sensor control unit 400 determines that the distance is a short distance. At this time, the short distance may include a distance between the proximity sensor 300 and a user when the user is positioned right in front of the proximity sensor 300 or the financial device. In the present embodiment, the power control for the display unit 500 and the respective modules 100 may be separately performed. However, this is only an example, and the power control for the display unit 500 and the respective modules 100 may be performed at the same time. The display unit 500 may include a monitor for displaying a financial transaction process state of the financial device, and correspond to an LCD or the like. The display unit 500 is powered on in the transaction standby mode and powered off in the power saving mode, according to control of the sensor control unit 400.

When the financial device satisfies the power saving mode entry condition, the main control unit 600 requests the sensor control unit 400 to control the display unit 500 to enter the power saving mode, and provides a power saving mode entry command to the modules 100. When all of the modules 100 enter the power saving mode, the main control unit 600 sends a power-off command to the power control unit 200, and then enters the power saving mode. The power saving mode entry condition may include a preset time such as night time or a case in which a user's access does not occur during a predetermined time. In the power saving mode, the main control unit 600 may enable only a part for a minimum operation, such as a communication unit which is charge of communication with the sensor control unit 400 and the power control unit 200 and communication for the state of the financial device with a host. Thus, since unnecessary operation program processes are all blocked, the power consumption of the main control unit 600 can be reduced.

At this time, the main control unit 600 stores operation information (sensors and actuator information, and the like) of the modules 100 in storage units (120 of FIG. 5) of the respective modules 100, when entering the power saving mode. At this time, when existing pieces of information are accumulated and stored in the storage units, the main control unit 600 may set the respective modules using the latest piece of information among the stored pieces of information. Furthermore, when the pieces of information are accumulated and stored, the main control unit 600 may delete data which have been stored for more than a predetermined period of time. That is, when new pieces of information are stored, the main control unit 600 may store the new pieces of information by overwriting the data stored for more than a predetermined period of time with the new pieces of information.

When a power saving mode cancellation request is received from the sensor control unit 400, the main control unit 600 enters the transaction standby mode, and when a transaction request is made by a user, the main control unit 600 requests the power control unit 200 to power on the modules 100. At this time, when entering the transaction standby mode, the main control unit 600 may enable programs required for the financial transaction. At this time, the main control unit 600 determines the last state (reset mode or power saving mode) of the financial device, which is stored in the storage units of the modules 100. The reset mode indicates a state in which a reset operation for the modules is required when main power is re-supplied after the operation of the financial device was closed in a general transaction state or the main power was removed to power off the financial device due to trouble shooting. The power saving mode may indicate a state in which the display unit or the modules of the financial device are temporarily powered off and the sensors are powered on, in order to save power when no users access the financial device. Thus, when a user accesses the financial device, the financial device can be automatically restarted to process a transaction, without a separate power-on operation. When the last state of the financial device is the reset mode, the operation information of the respective modules, for example, the sensors and actuators which are related to the respective modules may be reset to the optimal values. When the last state of the financial device is the power saving mode, the operation information stored in the storage units of the modules 100, for example, the operation information of the sensors and actuators may be fetched to drive the financial device to the transaction standby mode, without a reset operation. When the financial device is left in a power-off state for a long time in the reset mode, the financial device may enter a cold reset state. In this case, the states of the sensors and actuators may be changed. Thus, the reset mode is performed. The plurality of modules 100 may include a media processing module 101, a card module 102, a print module 103 and other modules (for example, bankbook module), which can monitor a sensor leveling state, motor speed, remaining media, guide state, divertor connection, mounting state and the like, in real time. When the media processing module 101, the card module 102, the print module 103 or other module is switched to the power saving mode, the states or values of the monitored items may be stored as operation information in the respective storage units 120. Then, when the power saving mode is canceled, the respective modules is set using the operation information stored in the storage units of the respective modules. For example, the operation information may be fetched in order to set the respective modules from the storage unit 120. Thus, the financial device can be immediately driven without a reset operation.

At this time, the main control unit 600 checks whether the operation information is stored in the storage units 120 of the respective modules 100. When the operation information is stored, the main control unit 600 determines that the previous mode was the power saving mode, sets the modules 100 using the stored operation information, and then controls the financial device to enter the transaction standby mode. During the power saving mode, the proximity sensor 300 is turned on. Thus, when a user is sensed by the proximity sensor 300, the main control unit 600 may set the respective modules 100 using the operation information stored in the storage units 120, and then control the financial device to enter the transaction standby mode.

On the other hand, when no operation information is stored in the storage units 120 of the respective modules 100, the main control unit 600 performs the reset mode.

In the power saving mode, the financial device may be powered off for a long time. In this case, the main control unit 600 may periodically cancel the power saving mode, in addition to the power saving mode cancellation request provided by the sensor control unit 400. For example, the cycle may be set to a short period of time (approximately one hour) in a dusty area or high-temperature and humidity area, and set to a long period of time (several hours) in an area with a pleasant operation environment.

The financial device having the above-described configuration can save electricity more efficiently than in a power saving method which simply controls a CPU in a sleep state by powering off the modules 100 through the power control unit 200.

Hereafter, specific embodiments of the financial device will be described in detail.

Figure 2:
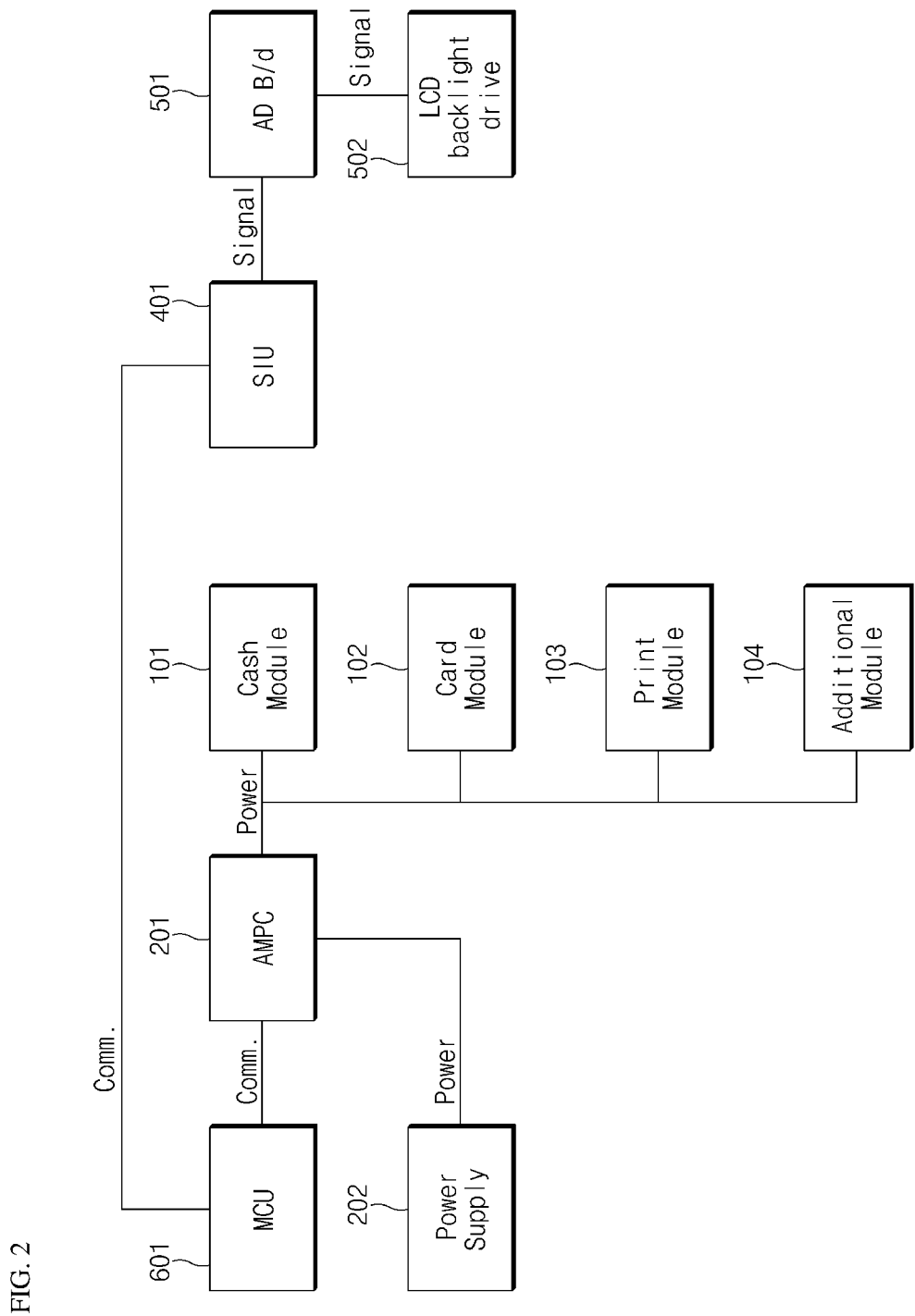
FIG. 2 is a block diagram illustrating a specific embodiment of the financial device of FIG. 1.
Figure 3:
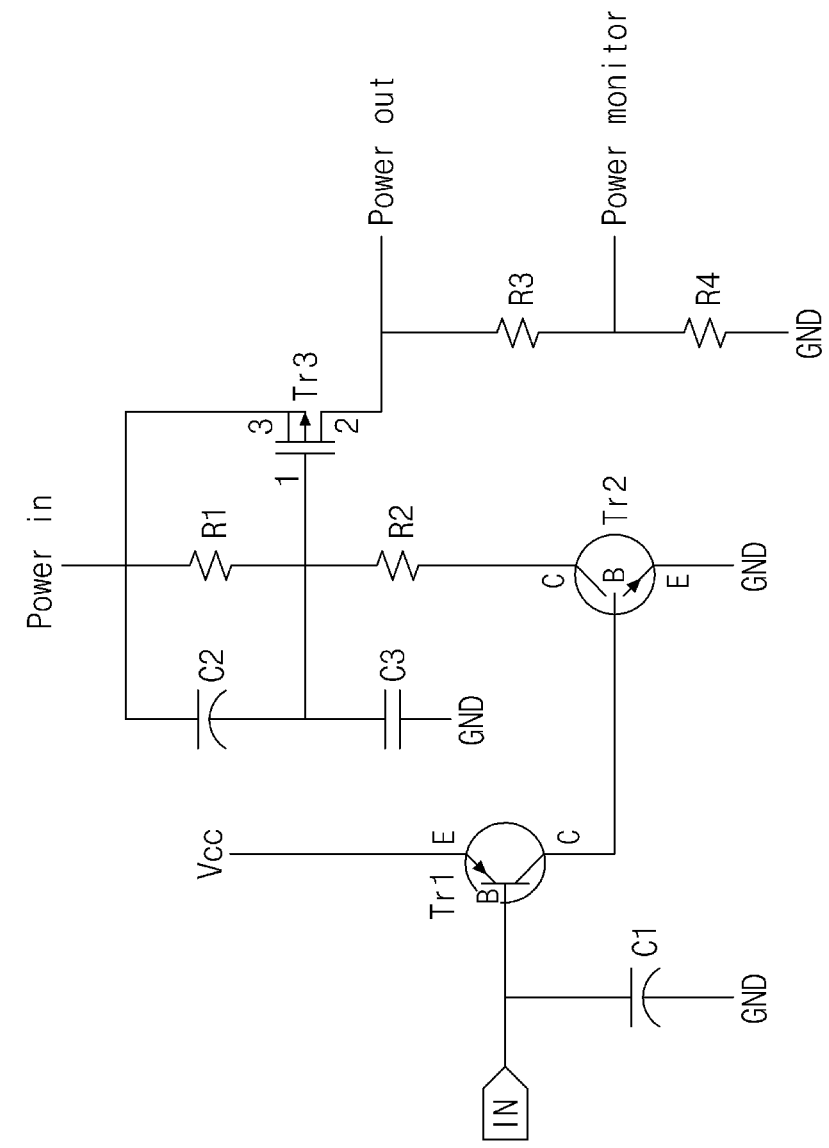
FIG. 3 is a circuit diagram illustrating a specific embodiment of an AMPC (ATM Module Power Controller) of FIG. 2.
Figure 4:
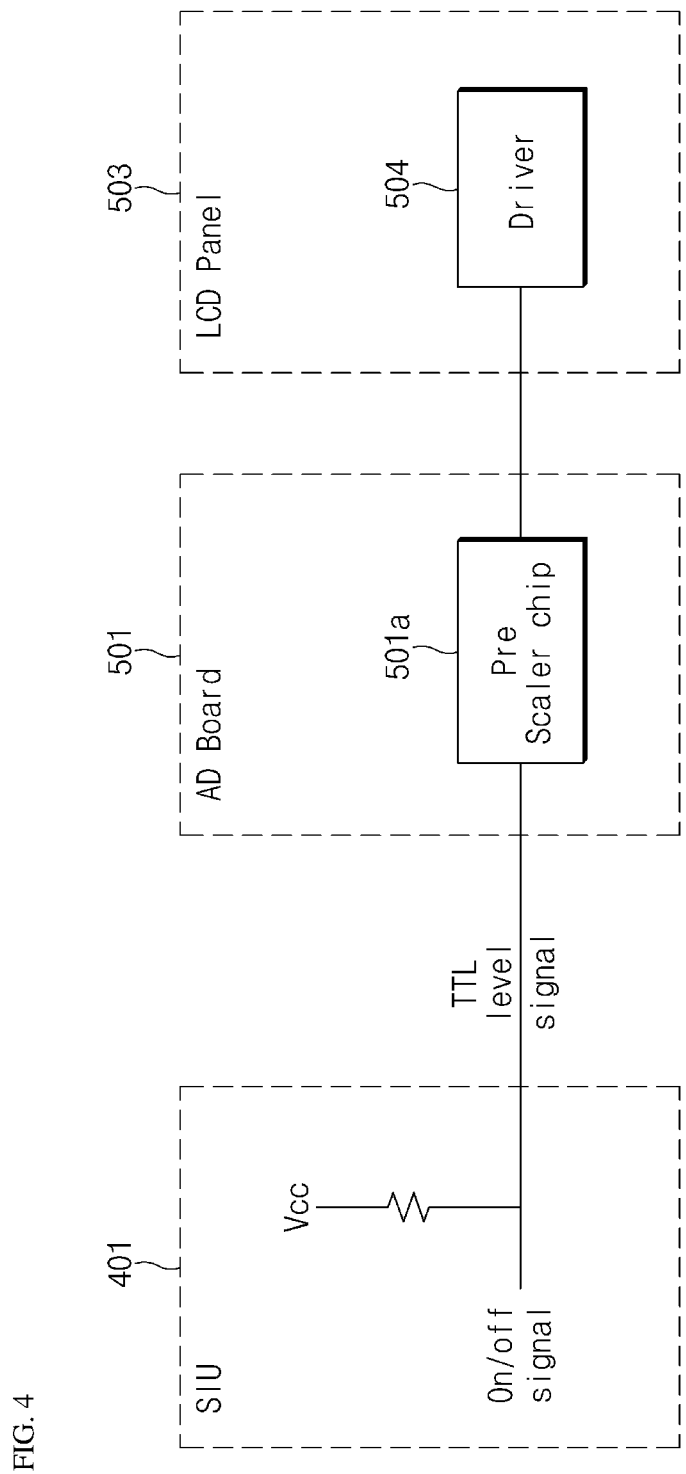
FIG. 4 is a diagram illustrating a specific connection relation between an SIU (Sensor Indicator Unit) and an AD board of FIG. 2.

FIG. 2 is a block diagram illustrating a specific embodiment of the financial device of FIG. 1, FIG. 3 is a circuit diagram illustrating a specific embodiment of an AMPC (ATM Module Power Controller) 201 of FIG. 2, and FIG. 4 is a diagram illustrating the connection relation between an SIU (Sensor Indicator Unit) 401 and an AD board 501.

Referring to FIG. 2, the financial device includes a media processing module 101, a card module 102, a print module 103 and an additional module 104, as the respective modules 100. The media processing module 101 may serve to provide a financial service such as a deposit or withdrawal process of media. The card module 102 may serve to provide a card-related financial service. The print module 103 may serve to perform a print operation related to a service provided to a user. The additional module 104 may serve to provide a function other than the functions of the above-described modules. The function of the additional module 104 is not limited to a specific function.

The financial device includes an AMPC 201 as the power control unit 200. The AMPC 201 is connected to the modules 101 to 104 individually, and controls whether to supply power to the respective modules 101 to 104. For example, the AMPC 201 controls power of actuators, sensors, communication modules and other parts which are included in the respective modules 101 to 104. At this time, the AMPC 201 is connected to a power supply 202 for providing power which is to be supplied to the respective modules 101 to 104.

The financial device may include a MCU (Main Control Unit) 601 as the main control unit 600. When the financial device satisfies the power saving mode entry condition, the MCU 601 sends a power saving mode entry command to the respective modules 101 to 104 and the SIU 401. Furthermore, when all of the modules 101 to 104 inform the MCU 601 of the power saving mode entry after entering the power saving mode, the MCU 601 sends a power-off command to the AMPC 201 to disconnect the power supplied to the respective modules 101 to 104 from the power supply 202.

The MCU 601 controls the respective modules 101 to 104 to switch over from the power saving mode to the standby mode, based on a user sensing signal sent from the SIU 401.

The financial device may additionally include the SIU 401 as the sensor control unit 400, and include an AD board 501 and an LCD backlight driver 502 as the display unit 500.

The SIU 401 may send a user sensing signal to the MCU 601 based on a detection result of the proximity sensor 300.

The SIU 401 may command the AD board 501 to turn on a backlight, based on the user sensing signal from the proximity sensor 300, and command the AD board to turn off the backlight, based on a power saving mode entry request from the MCU 601. The SIU 401 and the MCU 601 may be connected through RS-232, USB or another suitable method for communication.

The AD board 501 controls the LCD backlight driver 502 based on a control signal from the SIU 401, and the LCD backlight driver 502 turns on the backlight to turn on the display unit 500, and turns off the backlight to turn off the display unit 500.

FIG. 2 does not illustrate the connection relation between the MCU 601 and the respective modules 101 to 104. However, this is only for convenience of description, and the MCU 601 may be connected to the respective modules 101 to 104 in order to perform communication for sending a power saving mode entry command.

FIG. 3 is a detailed circuit diagram of the AMPC 201.

The AMPC 201 may include a first transistor Tr1, a second transistor Tr2, a third transistor Tr3, a plurality of capacitors C1 to C4 and a plurality of resistors R1 to R4.

The first transistor Tr1 receives a power on/off command from an input terminal IN through the base thereof. According to the received command, the first transistor Tr1 controls whether to apply a voltage Vcc to the second transistor Tr2, i.e. switching on/off. The first transistor Tr1 may be a PNP type BJT (Bipolar Junction Transistor), receive the voltage Vcc through the emitter thereof, and have a collector connected to the base of the second transistor Tr2.

The second transistor Tr2 may receive the voltage Vcc from the first transistor Tr1 through the base thereof. According to whether the voltage Vcc is applied, whether the second transistor Tr2 is switched on may be controlled. The second transistor Tr2 may be an NPN type BJT, and have a collector electrically connected to the power supply (Power_in) 202 and an emitter connected to a ground.

The third transistor Tr3 may be a MOSFET (Metal-Oxide Semiconductor Field Effect Transistor), have a source connected to the power supply 202 and a drain connected to an output terminal, and supply power from the power supply 202 to the respective modules 101 to 104. The third transistor Tr3 may be a P-channel MOSFET.

Between the gate of the third transistor Tr3 and the power supply 202, the capacitor C2 and the resistor R1 are connected in parallel to each other. Between the gate of the third transistor Tr3 and a ground, the capacitor C3 is connected. Between the gate of the third transistor Tr3 and the collector of the second transistor Tr2, the resistor R2 is connected.

The operation of the AMPC 201 will be described in detail.

At a standby state, the first and second transistors Tr1 and Tr2 are set in an on state. Thus, the third transistor Tr3 is turned on in response to a low-level voltage applied to the gate thereof. Furthermore, the power supplied from the power supply 202 is provided to the respective modules 101 to 104 through an output terminal Power_out.

When the power saving mode condition of the financial device is satisfied, the AMPC 201 receives a power-off command from the MCU 601. Thus, the first transistor Tr1 is turned off, and the voltage Vcc applied to the base of the second transistor Tr2 is blocked. As the voltage Vcc applied to the base of the second transistor Tr2 is blocked, the second transistor Tr2 is turned off to change the voltage applied to the gate of the third transistor Tr3 to a high state.

When the third transistor Tr3 is turned on to apply power to the respective modules 101 to 104, an in-rush current of dozens of amperes may be generated to damage the respective modules 101 to 104. Thus, the values of the capacitors C2 and C3 and the resistors R1 and R2 are properly adjusted to control the switching speed of the third transistor Tr3, thereby preventing the generation of the in-rush current.

Additionally, a voltage may be divided through the voltage divider R3 and R4 at the output terminal, in order to monitor an output voltage. That is, it is possible to monitor whether a voltage is normally outputted to the respective modules 101 to 104.

In the present embodiment, the first to third transistors Tr1 to Tr3 are set to specific types. However, the present embodiment is not limited thereto. For example, the financial device may include the AMPC 201 in which the first transistor Tr1 is set to an NPN transistor, the second transistor Tr2 is set to a PNP transistor, and the third transistor Tr3 is set to an N-channel MOSFET. In this case, the other circuit components may be properly changed.

FIG. 3 illustrates one circuit set. If necessary, however, a separate circuit set may be formed for each of the modules 101 to 104.

Hereafter, referring to FIG. 4, the SIU 401 and the AD board 501 will be described.

The SIU 401 may be connected to the AD board 501, command the AD board 501 to turn on the backlight, based on a user sensing signal from the proximity sensor 300, and command the AD board 501 to turn off the backlight, based on a power saving mode entry request from the MCU 601. The on/off control signal sent to the AD board 501 from the SIU 401 may include a TTL-level signal.

The AD board 501 receives the on/off control signal from the SIU 401 through a pre-scaler chip 501a, and supplies a control signal corresponding to the received signal to a driver 502 installed in the display panel 503, in order to control turn-on/off of the display panel 503. Thus, the display unit 500 or the display panel 503 is switched between the power saving mode and the waiting mode.

When the backlight is a CCFL (Cold Cathode Fluorescent Lamp)-type backlight, the control for the driver 502 may be performed by controlling turn-on/off of an inverter. On the other hand, when the backlight is an LED-type backlight, an LED backlight drive signal of the display panel 503 may be directly controlled.

In this way, the respective components of the financial device may be configured. Hereafter, the configurations of the respective modules 101 to 104 will be described.

Figure 5:
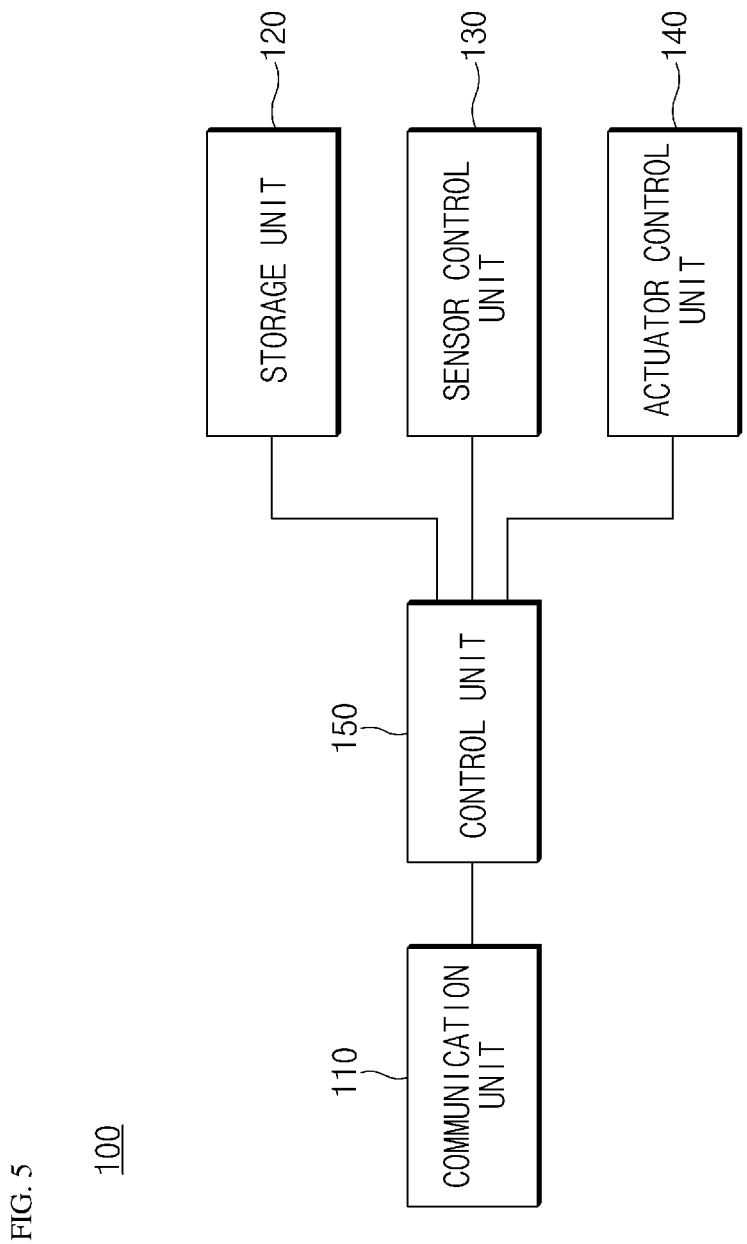
FIG. 5 is a block diagram illustrating components of each module in the financial device according to the embodiment.

FIG. 5 is a block diagram illustrating components of each of the modules 100 in the financial device according to the embodiment. The module 100 illustrated in FIG. 5 may correspond to one module among the plurality of modules 100 illustrated in FIG. 1. Each of the modules may have a difference in configuration depending on the function thereof. However, the following descriptions will be focused on the components which are commonly required to perform the power saving mode.

Referring to FIG. 5, each of the modules 100 includes a communication unit 110, a storage unit 120, a sensor control unit 130, an actuator control unit 140 and a control unit 150.

The communication unit 110 performs communication with the main control unit 600.

The storage unit 120 may store information on whether the financial device was in the reset mode or the power saving mode before entering the power saving mode, and store various pieces of operation information in the form of a state information table illustrated in FIG. 8. The operation information may include operation information of the sensor and actuator (not illustrated), which are provided from the sensor control unit 130 and the actuator control unit 140, operation information required for driving other modules, and setting information required for immediately driving a module when power is applied to the module. The storage unit 120 may be implemented with a nonvolatile memory, and store operation information for each memory address as illustrated in FIG. 8. The reset mode is where the operation of the financial device is closed in a general transaction state and the financial device is powered off for a long time. When the financial device is left in the power-off state for a long time, the financial device may enter a cold reset state. In this case, since the states of the sensor and actuator can be changed, a reset operation is performed again. On the other hand, the power saving mode is where the financial device is temporarily powered off in order to minimize power consumption. When the power saving mode is canceled, the previously stored operation information is used to set the respective modules.

The reset mode state is where the financial device is completely powered off because the business time of the financial device was over. The power saving mode state is where each module of the financial device is temporarily turned off but the sensors and the like are turned on to automatically restart the financial device without a separate power-on operation, when a user accesses the financial device. For example, the module 100 manages the sensor value and the actuator value through variables in firmware. The variables in firmware indicate the operation information of each module. The variables are reset when the module 100 is powered off. When the financial device enters the power saving mode in a state where the variables are reset, a reset driving process needs to be performed in order to acquire variables for driving the financial device to the standby mode during a wake-up operation, the reset driving process including a sensor reset operation and an actuator reset operation. Due to the reset driving process, quite a long time is required to switch over from the power saving mode to the standby mode. Thus, before the module enters the power saving mode, the operation information of the module, that is, the operation information used when the sensor and actuator are currently driven may be previously stored. In this state, the financial device may enter the power saving mode or the main power off mode. Thus, when the financial device is woken up later, the financial device may enter the transaction standby mode using the previously stored operation information of the sensor and actuator, without a reset driving process such as a sensor reset operation or actuator reset operation, which makes it possible to minimize the time required for switching over from the power saving mode to the transaction standby mode. The media processing module 101, the card module 102, the print module 103 or other modules (for example, bankbook related module) may monitor a sensor leveling state, motor speed, remaining media, guide state, divertor connection state, module mounting state and the like, in real time. When the media processing module 101, the card module 102, the print module 103 or other modules are switched to the power saving mode, the states or values of the monitored items may be stored as the operation information in the respective storage units 120 thereof.

The sensor control unit 130 controls the operation of the sensor (not illustrated), and determines the state information of the sensor. At this time, the sensor indicates a sensor which is installed in the module, in addition to the proximity sensor 300. The actuator control unit 140 controls the operation of the actuator (not illustrated), and determines the operation information of the actuator.

The control unit 150 controls the operations of the respective units. When receiving a power saving mode entry command from the main control unit 600 through the communication unit 110, the control unit 150 stores the current state information of the sensor and actuator in the storage unit 120 in connection with the sensor control unit 130 and the actuator control unit 140, and then enters the power saving mode.

When receiving the power saving mode entry command from the main control unit 600, the plurality of modules 100 of the financial device according to the embodiment may previously store the state (power saving mode or reset mode) just before the power saving mode and the operation information of the sensor and actuator. When a user accesses the financial device, the plurality of modules 100 may minimize the time required for entering the transaction standby mode from the power saving mode, using the corresponding information.

Meanwhile, it is described that each module include the storage unit 120 on the above embodiments, but it is not limited thereto. For example, it could be configured to comprise separate one storage unit that is used in common, and the storage unit store and manage the operation information of whole modules 100.

Hereafter, referring to FIG. 6, a power saving mode control method of the financial device according to the embodiment will be described in detail.

First, when it is determined at step S101 that the financial device needs to enter the power saving mode, the main control unit 600 requests the sensor control unit 400 to control the display unit 500 to enter the power saving mode, at step S102. Then, the sensor control unit 400 controls the display unit 500 to enter the power saving mode at step S103. When it is determined that the financial device needs to enter the power saving mode, it may indicate that there exists no user who uses the financial device. The financial device senses an access of a user through the proximity sensor 300.

Figure 6:
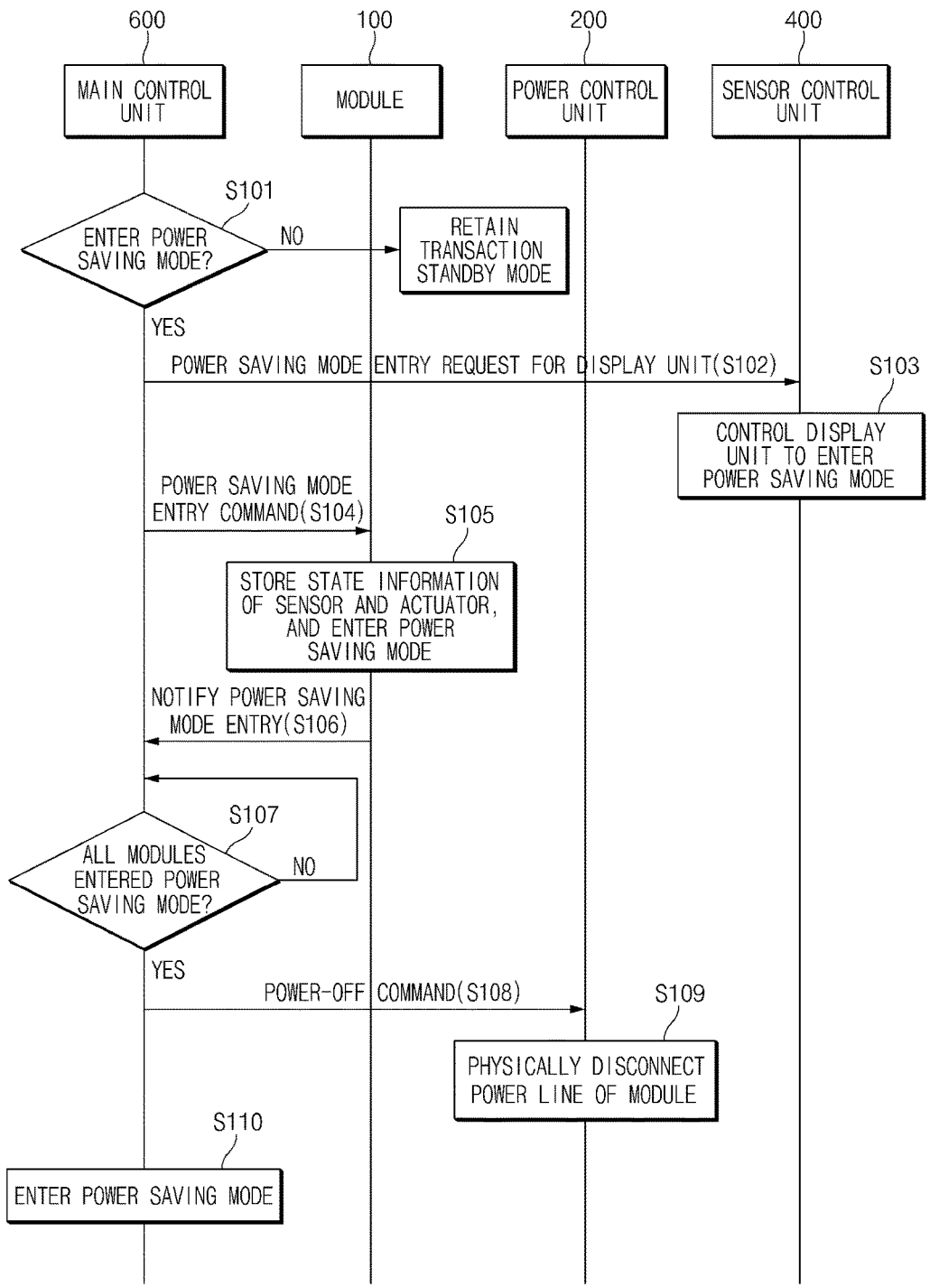
FIG. 6 is a flowchart illustrating a power saving mode control method of the financial device according to the embodiment.

FIG. 6 illustrates an example in which the main control unit 600 requests the sensor control unit 400 to control the display unit 500 to enter the power saving mode, and then provides the power saving mode entry command to the module 100. However, the power saving mode entry request for the display unit 500 and the power saving mode entry command to the module 100 may be provided at the same time. Before the display unit 500 enters the power saving mode, the power saving mode entry command may be provided to the module 100.

The main control unit 600 provides the power saving mode entry command to the module 100 at step S104, and the module 100 stores the operation information of the sensor and actuator and the current state of the financial device (reset mode or power saving mode) and enters the power saving mode, at step S105. Then, the module 100 informs the main control unit 600 of the power saving mode entry at step S106. At this time, FIG. 6 illustrates the process in which one module enters the power saving mode. However, the present embodiment is not limited thereto, but the process S104 to S106 may be performed on each of the plurality of modules.

The main control unit 600 checks whether all of the modules entered the power saving mode, at step S107. When all of the modules entered the power saving mode, the main control unit 600 sends a power-off command to the power control unit 200 at step S108. Thus, the power control unit 200 electrically or physically disconnects the power lines of the respective modules at step S109. Then, the power supply to the respective modules 100 is stopped. At this time, the electrical or physical disconnection method for the power lines may be performed through a typical technique. When the modules enter the power saving mode, the operation information of the respective modules is stored in the storage units.

The main control unit 600 controls itself to enter the power saving mode at step S110.

The financial device according to the embodiment controls the plurality of modules 100 as well as the display unit 500 to enter the power saving mode. In particular, the financial device may electrically or physically disconnect the power lines of the plurality of modules 100, thereby further improving the power saving effect.

Figure 7:
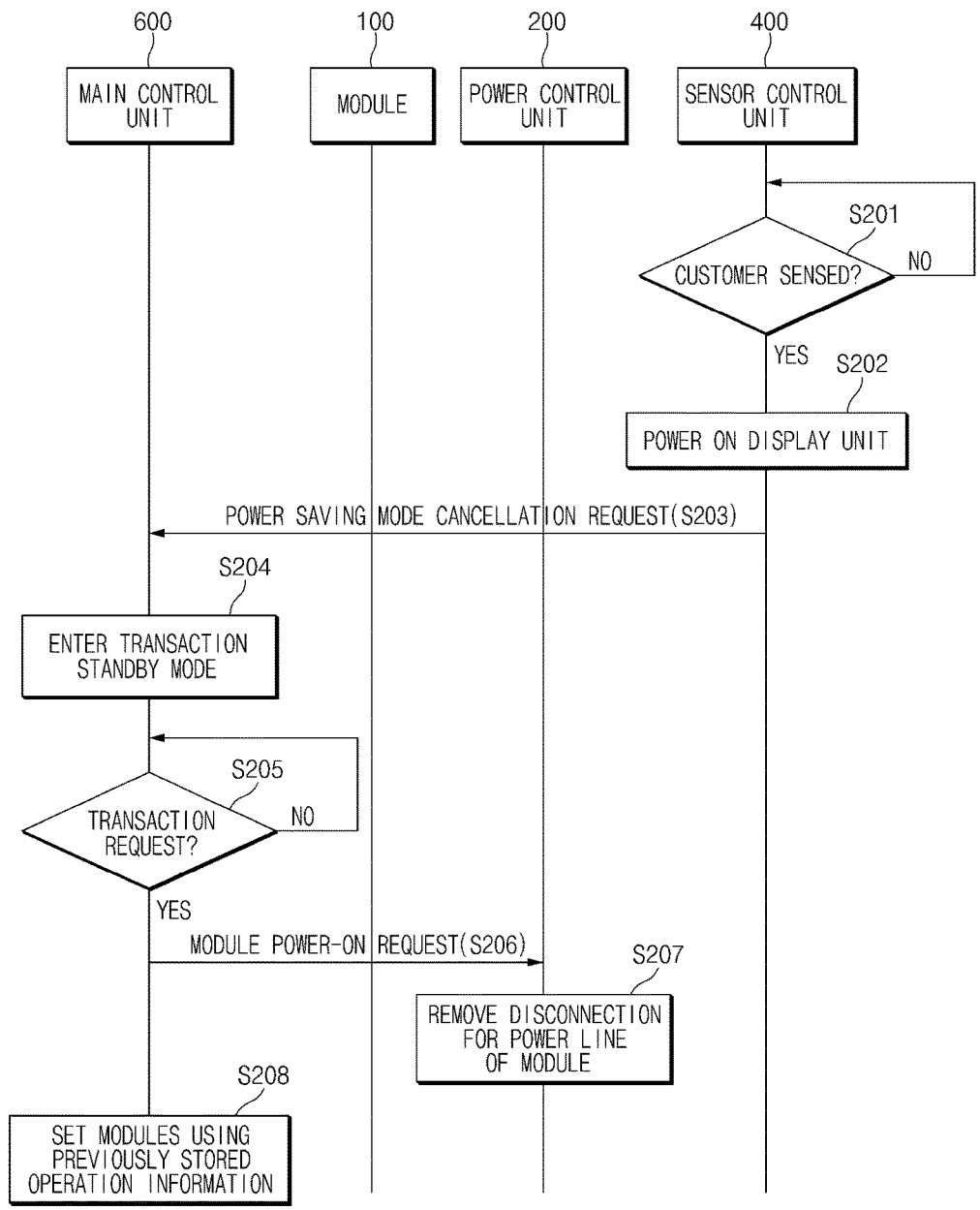
FIG. 7 is a flowchart illustrating a wake-up mode control method of the financial device according to the embodiment.

Hereafter, referring to FIG. 7, a wake-up mode (transaction standby mode) control method of the financial device according to the embodiment will be described in detail. FIG. 7 illustrates a wake-up process when the module 100 is set in a power-off state through the process of FIG. 6.

Referring to FIG. 7, the proximity sensor 300 senses an access of a user and sends the sensing result to the sensor control unit 400. Then, the sensor control unit 400 determines the user access using the sensing result received from the proximity sensor 300, at step S201. When a user is sensed through the proximity sensor or a user sensing signal is received from the proximity sensor, the sensor control unit 400 powers on the display unit 500 at step S202. The sensor control unit 400 requests the main control unit 600 to cancel the power saving mode, such that the financial device can enter the transaction standby mode, at step S203. Then, the main control unit 600 enters the transaction standby mode according to the request of the sensor control unit 400, at step S204.

FIG. 7 illustrates an example in which, when a user is sensed through the proximity sensor 300, the display unit 500 is first powered on, and the sensor control unit 400 then requests the main control unit 600 to cancel the power saving mode. However, the present embodiment is not limited thereto. When a user is sensed through the proximity sensor 300, the sensor control unit 400 may request the main control unit 600 to cancel the power saving mode at the same time as the display unit 500 is powered on. Thus, as soon as the display unit 500 is powered on, the main control unit 600 may enter the transaction standby mode.

In the transaction standby mode, the main control unit 600 determines whether a transaction request is made from a user, at step S205. When a transaction request is made, the main control unit 600 requests the power control unit 200 to power on the module 100, at step S206. Thus, the power control unit 200 removes the disconnection for the power line of the module 100 at step S207. Then, the main control unit 600 sets the module 100 using the operation information which was stored in the storage unit 120 before entering the power saving mode, at step S208.

According to the embodiment, when there are no users using the financial device, the modules for performing financial transactions such as deposit and withdrawal as well as the screen of the financial device may be powered off. Then, when a user accesses the financial device, the financial device may be powered on, which makes it possible to improve the power saving effect.

So far, it has been described that all of the components forming the embodiment of the present invention are coupled and operated as one unit. However, the present invention is not limited thereto. That is, one or more of the components may be selectively coupled and operated without departing the scope of the present invention. Furthermore, each of the components may be implemented as independent hardware. However, a part or all of the components may be selectively combined, but implemented as a computer program having a program module which executes a part or all of processes combined in one or more pieces of hardware. Codes and code segments forming the computer program may be easily inferred by those skilled in the art. Such a computer program may be stored in computer readable media and read and executed by a computer, thereby implementing the embodiments of the present invention. The storage media of the computer program may comprise magnetic recording media, optical recoding media and carrier wave media.

Furthermore, the components of the system may be connected to each other through arbitrary digital data communication (for example, communication network). Examples of the communication network may comprise NFC (Near Field Communication), LAN (Local Area Network), WAN (Wide Area Network) and the Internet.

So far, it has been described that all of the components forming the embodiment of the present invention are coupled and operated as one unit. However, the present invention is not limited thereto. That is, one or more of the components may be selectively coupled and operated without departing the scope of the present invention. Furthermore, each of the components may be implemented as independent hardware. However, a part or all of the components may be selectively combined, but implemented as a computer program having a program module which executes a part or all of processes combined in one or more pieces of hardware. Codes and code segments forming the computer program may be easily inferred by those skilled in the art. Such a computer program may be stored in computer readable media and read and executed by a computer, thereby implementing the embodiments of the present invention. The storage media of the computer program may comprise magnetic recording media, optical recoding media and carrier wave media.

Furthermore, when it is described that one element "comprises", "includes" or "has" some elements, it should be understood that it may comprise (or include or has) only those elements, or it may comprise (or include or have) other elements as well as those elements if there is no specific limitation. The terms including technical or scientific terms have the same meanings as the terms which are generally understood by those skilled in the art to which the present invention pertains, as long as they are differently defined. The terms defined in a generally used dictionary may be analyzed to have meanings which coincide with contextual meanings in the related art. As long as the terms are not clearly defined in this specification, the terms may not be analyzed as ideal or excessively formal meanings.

According to the embodiments of the present invention, the financial device and the control method thereof can improve the power saving effect in a card/bankbook/media processing module as well as a monitor of the financial device.

While various embodiments have been described above, it will be understood to those skilled in the art that the embodiments described are by way of example only. Accordingly, the disclosure described herein should not be limited based on the described embodiments.

What is claimed is:

1. A financial device comprising:
one or more modules;
a storage unit to store the operation information of the one or more modules, when entering a power saving mode;

a main control controller to disconnect power to the one or more modules by providing the power saving mode entry command to the one or more modules after the operation information is stored in the storage unit, when entering the power saving mode;

a proximity sensor to sense whether a user accesses the financial device, a display to display a financial transaction of the financial device and its entry or cancellation of the power saving mode is controlled by turning on or off a backlight by a backlight driver;

a power controller to control power disconnection and disconnection removal for the one or more modules by electrically or physically disconnecting or connecting power lines of the one or more modules when receiving a power-off command from the main control controller; and a sensor controller to control the turning on and off of the display; and wherein the main controller cancels the power saving mode based on a detection of the proximity sensor and a predetermined cycle.

2. The financial device of claim 1, wherein the main controller sets the one or more modules using the operation information stored in the storage unit and controls the one or more modules to enter a transaction standby mode, when the power saving mode is canceled.

3. The financial device of claim 1, wherein when receiving the user sensing result from the proximity sensor, the sensor controller turns on the display, and requests the main controller to cancel the power saving mode.

4. The financial device of claim 1, wherein when receiving a power saving mode entry request from the main controller, the one or more modules store operation information of a sensor and actuator in the storage unit, immediately before entering the power saving mode.

5. The financial device of claim 4, wherein the one or more modules store information on whether the current transaction state is a reset mode or power saving mode, when storing the operation information of the sensor and actuator.

6. The financial device of claim 4, wherein each of the one or more modules comprises:

a communication circuitry to receive the power saving mode entry command from the main controller; and a controller to control one or more financial activities at least one of deposit, withdrawal, card related process and bankbook related process and control the one or more modules to store the operation information of the sensor and the actuator in the storage unit, and enter the power saving mode when receiving the power saving mode entry command from the main controller through the communication circuitry.

7. The financial device of claim 4, wherein when the power disconnection of the one or more modules is removed, the main controller enters a transaction standby mode using the sensor and actuator operation information stored in the storage unit.

8. The financial device of claim 1, wherein when the power disconnection of the one or more modules is removed by the power controller, the main controller determines whether a transaction state before the one or more modules are powered off is a reset mode or power saving mode.

9. The financial device of claim 8, wherein the main controller performs the reset mode on the sensor and actuator, when the transaction state before the one or more modules are powered off is the reset mode.

10. The financial device of claim 1, wherein the main controller cancels the power saving mode based on the detection of the proximity sensor and a predetermined cycle set to vary depending on environment.

* * * * *